United States Patent
D'Angelo et al.

(10) Patent No.: US 7,330,903 B2
(45) Date of Patent: Feb. 12, 2008

(54) METHOD, COMPUTER PROGRAM PRODUCT, AND SYSTEM FOR ROUTING MESSAGES IN A COMPUTER NETWORK COMPRISING HETEROGENOUS DATABASES

(75) Inventors: Dario D'Angelo, Los Gatos, CA (US); Madeline M. Fay, Morgan Hill, CA (US); Steve T. Kuo, San Jose, CA (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 10/715,770

(22) Filed: Nov. 17, 2003

(65) Prior Publication Data

US 2005/0114454 A1    May 26, 2005

(51) Int. Cl.
G06F 15/16 (2006.01)
G06F 7/00 (2006.01)

(52) U.S. Cl. .................. 709/236; 709/238; 707/10

(58) Field of Classification Search ................ 709/201, 709/203, 216–219, 236–239, 245–246; 707/1–10, 707/100–104.1
See application file for complete search history.

(56) References Cited

U.S. PATENT DOCUMENTS

| | | | |
|---|---|---|---|
| 6,442,690 B1 | 8/2002 | Howard, Jr. et al. ........ | 713/175 |
| 6,519,642 B1 | 2/2003 | Olsen et al. ................. | 709/227 |
| 7,024,474 B2 * | 4/2006 | Clubb et al. ................. | 709/223 |
| 7,111,006 B2 * | 9/2006 | Vange et al. .................. | 707/10 |
| 2002/0056012 A1 * | 5/2002 | Abileah et al. ............. | 709/310 |
| 2003/0009733 A1 | 1/2003 | Hathaway et al. ............. | 716/6 |

* cited by examiner

Primary Examiner—Glenton B. Burgess
Assistant Examiner—Yasin M Barqadle
(74) Attorney, Agent, or Firm—Gregory M. Plow (57) ABSTRACT

A message is received in a first form for communicating with a first DBMS wherein the first form comprises an internet message prefix and a data portion, the internet message prefix comprising routing information for a client. The message is modified into a second form wherein the client routing information is integrated into the data portion of the message and wherein the second form of the message is utilized to communicate with a second DBMS. A result message generated by the second DBMS is received wherein the result message comprises a result data portion, the result data portion including the routing information. The result message is modified to the first form wherein the result message comprises the internet message prefix, the internet message prefix comprising the client routing information obtained from the result data portion. In this manner, the result message may be routed to the client.

27 Claims, 10 Drawing Sheets

METHOD, COMPUTER PROGRAM PRODUCT, AND SYSTEM FOR ROUTING MESSAGES IN A COMPUTER NETWORK COMPRISING HETEROGENOUS DATABASES

FIELD OF INVENTION

The present invention relates generally to the routing of messages over a computer network. More specifically, the present invention relates to a method, computer program product and system for the preservation of routing information in the prefix portion of a message independent from the communication protocol being utilized.

BACKGROUND

In the past, leading-edge commercial applications with high performance and reliability requirements were typically run on legacy systems, such as Information Management System (IMS). (IMS is a trademark of International Business Machines Corporation in the United States, other countries, or both.). Today, the near universal acceptance of Web Technologies increases the demands for communication-based applications; however, even in today's distributed computing environments with Web based applications, it is very common for the data associated with WEB based applications to be legacy data (i.e. data that is managed by legacy systems, such as IMS). Therefore, many enterprises are faced with the challenge of making core business applications currently running on legacy systems available to the Internet.

IMS is a hierarchical database management system (HDBMS) developed by International Business Machines Corporation with wide spread usage in many large enterprises where high transaction volume, reliability, availability and scalability are of the utmost importance. IMS provides software and interfaces for running the businesses of many of the world's largest corporations. However, companies incorporating IMS databases into their business models typically make significant investments in IMS application programs in order to have IMS perform meaningful data processing particularly tailored to the needs of their respective enterprises. IMS application programs are typically coded in COBOL, PL/I, C, PASCAL, JAVA or assembly language.

In one example, the typical components of a Web based application may comprise an application program to perform particular business logic, a client system including a web browser for entering data and displaying results, a Web server to provide communication and security layers around the customer application, a database adapter to facilitate application communications with a database subsystem for the processing of data requests. A user interfaces with a client system to view and/or process data in accordance with the their needs and the capabilities provided by the various enterprise applications. This results in the client system's web browser communicating with the Web server component using the HyperText Transfer Protocol (HTTP) over an Internet connection using Transmission Control Protocol/Internet Protocol (TCP/IP). The Web server identifies the appropriate application and schedules this application for execution. Upon receiving control, the application invokes the database adapter to communicate with the database subsystem to handle data requests.

New protocols have been developed by IMS to accommodate web-based applications requiring access to IMS data. However, in some computing network environments it may be necessary for a first DBMS (Database Management Subsystem) to communicate with a second DBMS. In some database environments, the first DBMS is referred to as the front-end DBMS and the second DBMS is referred to as the back-end DBMS. Whenever the back-end DBMS is non-IMS and the front-end DBMS is IMS a serious problem, briefly discussed infra, may arise.

A network message, representing a communication to IMS, may contain an internet message prefix which, among other information, contains routing information identifying address information associated with the client originating the information request. Eventually, any results associated with this request must be routed back to the originating client. However, when IMS, the front-end DBMS, is required to communicate with a non-IMS DBMS on the back-end, the internet message prefix may be discarded in some circumstances in conforming to the requirements of the particular network and back-end DBMS protocols.

In this set of circumstances, the result message generated by the back-end DBMS is routed back to the originating front-end DBMS; however, the result message may be void of routing information for the originating client request. If so, such a result message is referred to as an "orphaned" message, as it is not possible to return the message to the originating client.

Accordingly, there is a great need for an enhanced message routing facility that preserves client routing information contained in an internet message prefix within a computer network comprising heterogeneous databases.

SUMMARY OF THE INVENTION

To overcome these limitations in the prior art briefly described above, the present invention provides a method, computer program product and system for routing messages over a computer network comprising a plurality of DBMS systems wherein routing information within an internet message prefix is preserved in manner that is transparent to the selected communication protocol.

A message is received in a first form for communicating with a first DBMS wherein the first form comprises an internet message prefix and a data portion, the internet message prefix comprising routing information for a client. The message is modified into a second form wherein the client routing information is integrated into the data portion of the message and wherein the second form of the message is utilized to communicate with a second DBMS.

A result message generated by the second DBMS is received wherein the result message comprises a result data portion, the result data portion including the routing information. The result message is modified to the first form wherein the result message comprises the internet message prefix, the internet message prefix comprising the client routing information obtained from the result data portion. In this manner, the result message may be routed to the client.

In another embodiment of the present invention, the above-described technique for routing messages over a network may be provided as a computer system. The present invention may also be tangibly embodied in and/or readable from a computer-readable medium containing program code (or alternatively, computer instructions.) Program code, when read and executed by a computer system, causes the computer system to perform the above-described method.

In this manner, client routing information contained within an internet message prefix is preserved across multiple DBMS communication sequences transparent to any particular communication protocol selected for the communication. This is particularly advantageous for those applications operating in heterogeneous database environments where prefix information may be lost as different protocols are mandated for use with the different DBMS systems.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the limitations discussed supra associated with the prior art by teaching a system, computer program product, and method for routing messages over a computer network wherein routing information within an internet message prefix is preserved in manner that is transparent to the selected communication protocol.

Those skilled in the art will recognize, however, that the teaching contained herein may be applied to embodiments and variations not shown and that the present invention may be practiced apart from the specific details taught herein. Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
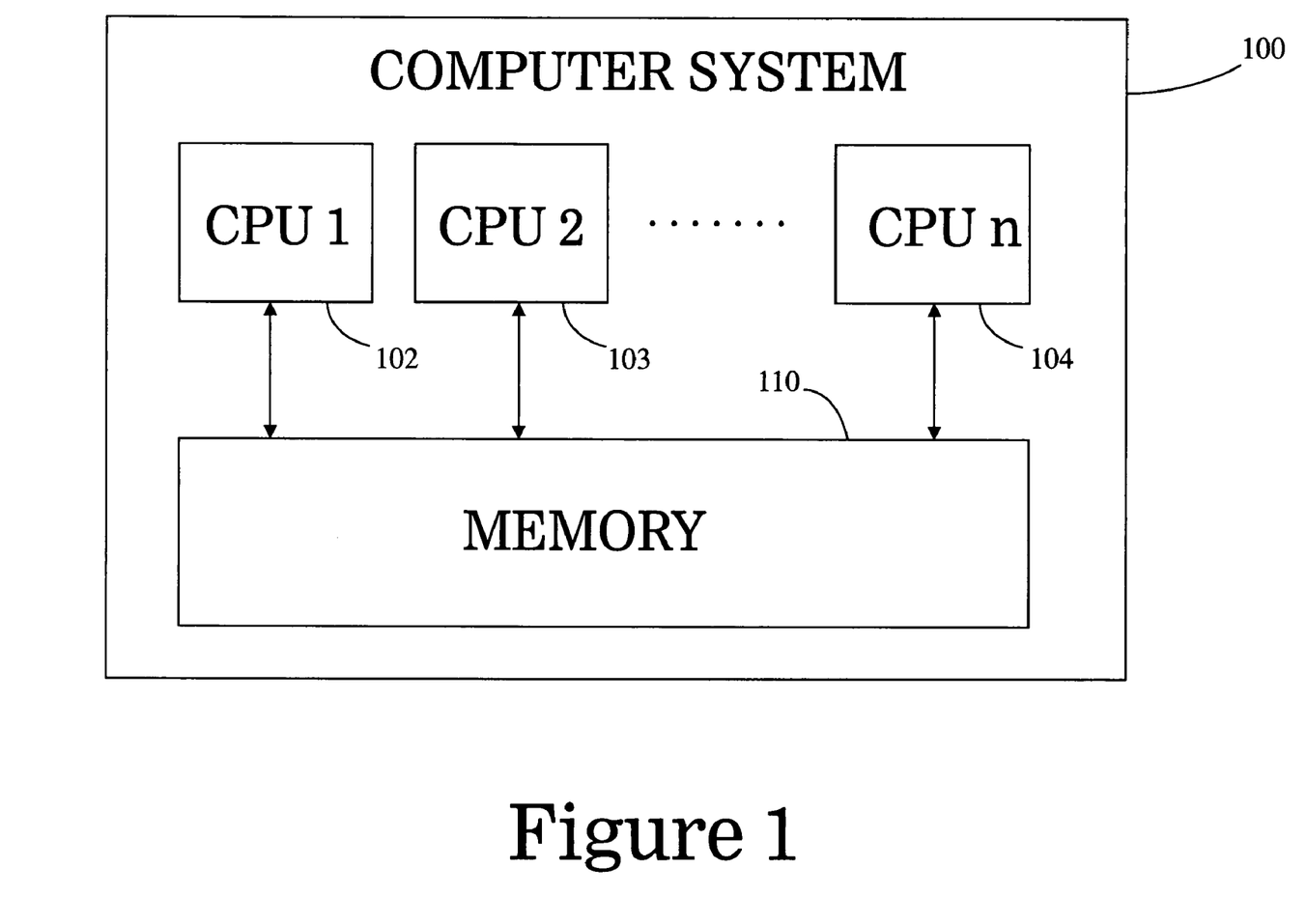
FIG. 1 is a block diagram of a typical computer system wherein the present invention may be practiced.

FIG. 1 is a block diagram of a computer system 100, such as the S/390 mainframe computer system. (S/390 is a registered trademark of International Business Machines Corporation in the United States, other countries, or both.) The computer system 100 comprises one or more central processing units (CPUs) 102, 103, and 104. The CPUs 102-104 suitably operate together in concert with memory 110 in order to execute a variety of tasks. In accordance with techniques known in the art, numerous other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, other alternative computing hardware environments, including workstations, personal computing devices, and servers, may be used without departing from the scope of the present invention.

Figure 2:
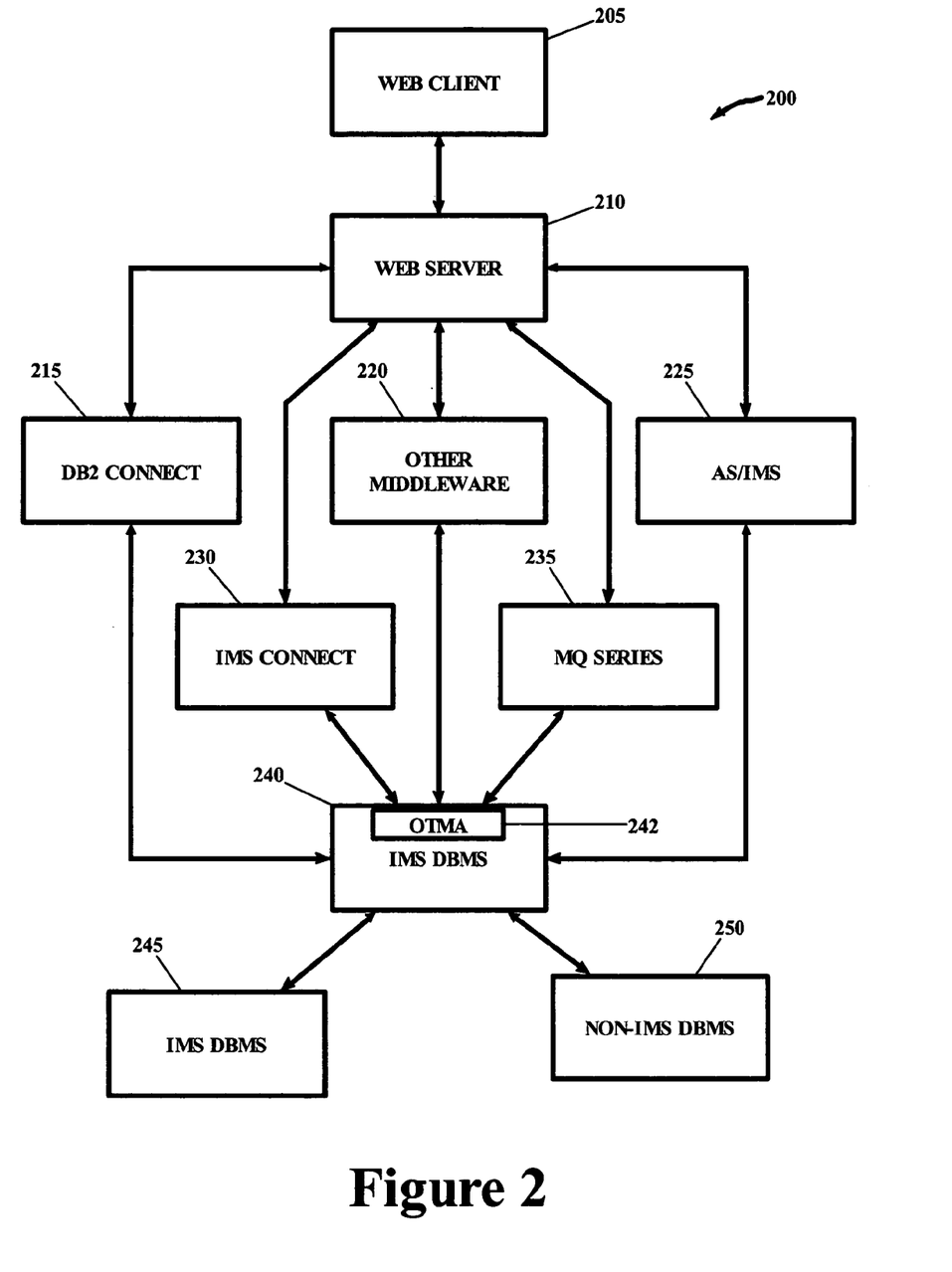
FIG. 2 is a block diagram showing an exemplary computer network comprising heterogeneous DBMS systems.

Referring now to FIG. 2, an exemplary computer network 200 is shown to illustrate various aspects relevant to the present invention. Web client 205 communicates with web server 210. Web server 210 communicates with any or all of a variety of components, such as DB2 Connect 215, AS/IMS 225, IMS Connect 230 or MQ Series 235. These components are hereinafter referred to as "middleware" components. Other middleware 220 components represents a variety of other products from numerous other vendors that are capable of communicating with web server 210 and IMS DBMS 240.

Middleware components 215, 220, 225, 230 and 235 each communicate with IMS DBMS 240 via a specialized communication interface known as Open Transaction Manager Access (OTMA) 242. IMS DBMS 240 may optionally communicate with a plurality of other DBMS systems, such as IMS DBMS 245 and/or Non-IMS DBMS 250.

Those of ordinary skill in the art will recognize that the various servers, middleware, and database systems discussed herein may be provided by a variety of current and future products and vendors. Accordingly, the present invention is not limited to particular ones of these, but is to be accorded the widest scope consistent with the principles and features described herein.

Those of ordinary skill in the art will further recognize that that network 200 is exemplary in nature and provides a structure to facilitate teaching various aspects of the present invention. Numerous other network configures are possible within the scope of the present invention. For example, web server 210 may be customized to interface directly with OTMA 242 without requiring further processing from middleware products 215, 220, 225, 230 or 235.

Generally, the novel methods disclosed herein may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, a system, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
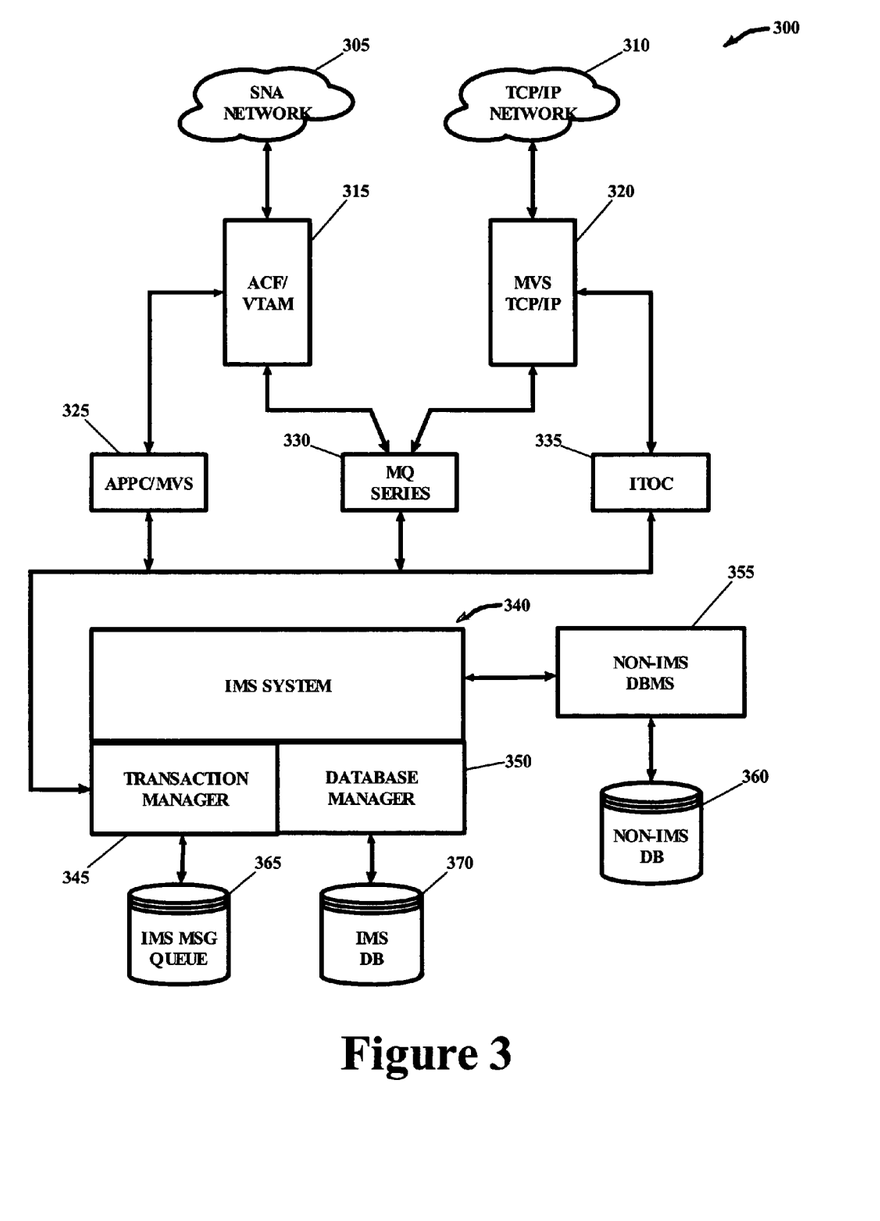
FIG. 3 is a block diagram showing a second exemplary computer network comprising heterogeneous DBMS systems.

Referring now to FIG. 3, an exemplary computer network 300 is shown wherein two different computer network architectures are deployed. Heterogeneous networks deploying different communication architectures and protocols are on the rise. Competitive pressures and the need to grow profitability are driving change in the corporate IT world, where enhanced communications capabilities between suppliers, customers, manufacturers, affiliates, business partners etc. demand that heterogeneous networks be deployed, without compromising performance and reliability. Converting existing networks across all of these entities, to obtain a homogeneous communication architecture and data form is cost prohibitive.

Accordingly, exemplary computer network 300 comprises SNA network 305 and TCP/IP network 310. SNA network 305 utilizes ACF/VTAM 315 to route messages through computer network 300, whereas TCP/IP network 310 utilizes MVS TCP/IP to route messages through computer network 300.

ACF/VTAM communicates with APPC/MVS 325 and/or MQ Series 330. MVS TCP/IP 320 communicates with ITOC 335 (IMS TCP/IP OTMA Connector) and/or MQ Series 330. Middleware components 325, 330 and 335 each communicate with IMS system 340 via the Transaction Manager component 345. Transaction Manager component 345 schedules transactions resulting from the receipt of messages through computer network 300 by queuing these messages in IMS message queue 365. These transactions are processed by IMS system 340 and data is read from and/or written to IMS database 370 in accordance with the needs of the transaction by invoking Database Manager 350.

IMS system 340 may further need to process data from a non-IMS database in completing required processing for a given transaction. In this event, IMS system 340 communicates with Non-IMS DBMS 355. Non-IMS DBMS 355, referred to in the art as a backend DBMS, reads data from and writes data to non-IMS database 360.

Figure 4A:
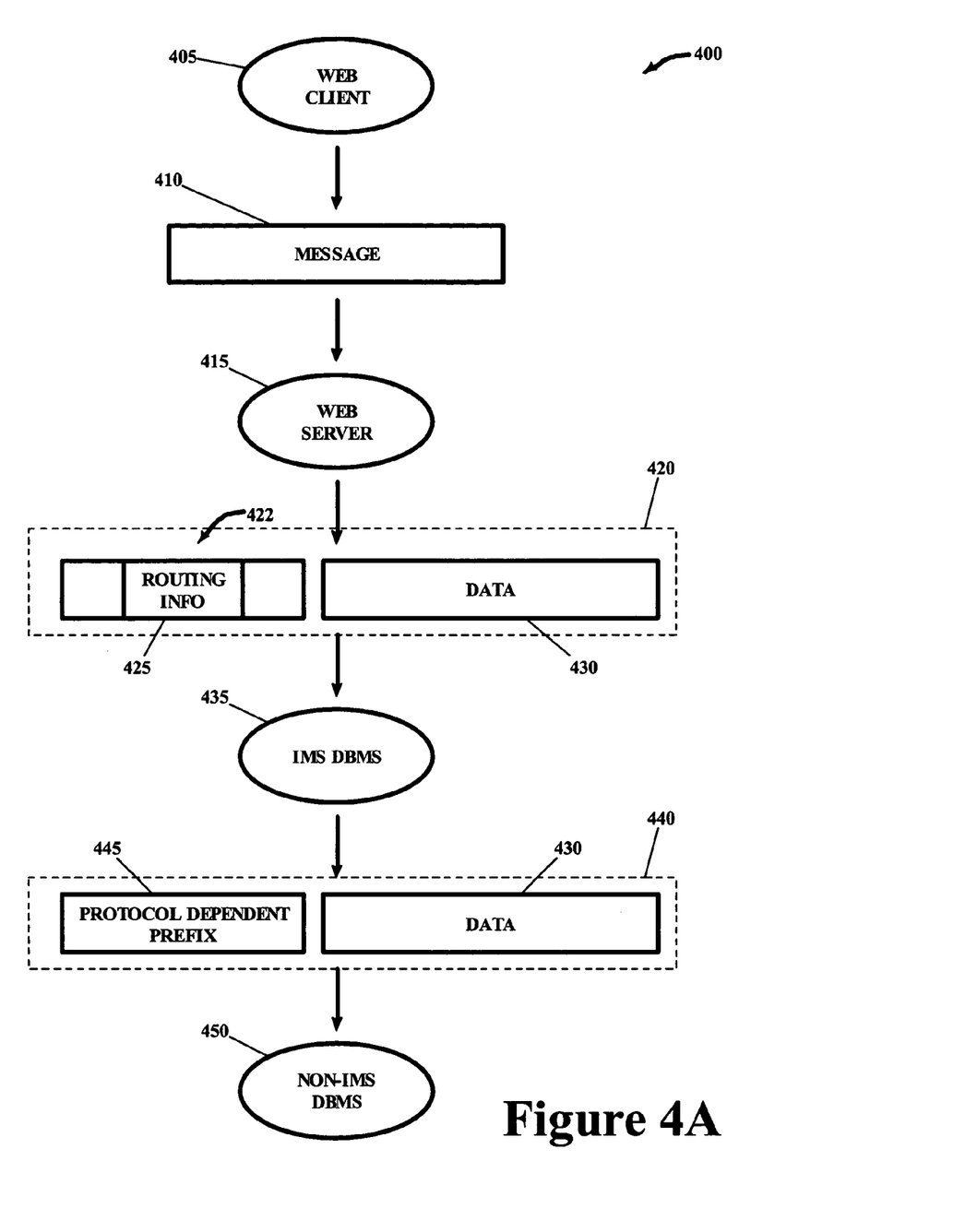
FIGS. 4A and 4B are block diagrams illustrating the flow of a network message through an exemplary computer network in the prior art.

Referring now to FIG. 4A, block diagram 400 illustrates the high level flow of a message through a prior art network comprising heterogeneous DBMS systems. Web client 405 generates a message 410 representing a transaction to be performed by a plurality of heterogeneous DBMS systems. Message 410 is received by web server 415. Web server 415 transforms message 410 into message 420, as required to comply with message protocols for IMS DBMS 435. Message 420 comprises internet message prefix portion 422 and data portion 430. Message prefix portion 422 further comprises routing information 425 containing network address information for web client 405.

IMS DBMS 435 receives message 420 and begins processing the transaction identified within message 420. During the course of processing, IMS DBMS 435 determines that further processing is required by non-IMS DBMS 450. Message 440 is generated by IMS DBMS 435 in accordance with the protocol requirements in effect for non-IMS DBMS 450. Message 440 comprises data portion 430, discussed supra and a protocol dependent prefix portion 445. In order to comply with protocol requirements for non-IMS DBMS 450, routing information 425 is discarded from prefix 445.

Non-IMS DBMS 450 receives message 440 and completes processing in accordance with the transaction information contained therein. The results from non-IMS DBMS 450 are encapsulated in a result message, as further discussed infra in conjunction with FIG. 4B.

Figure 4B:
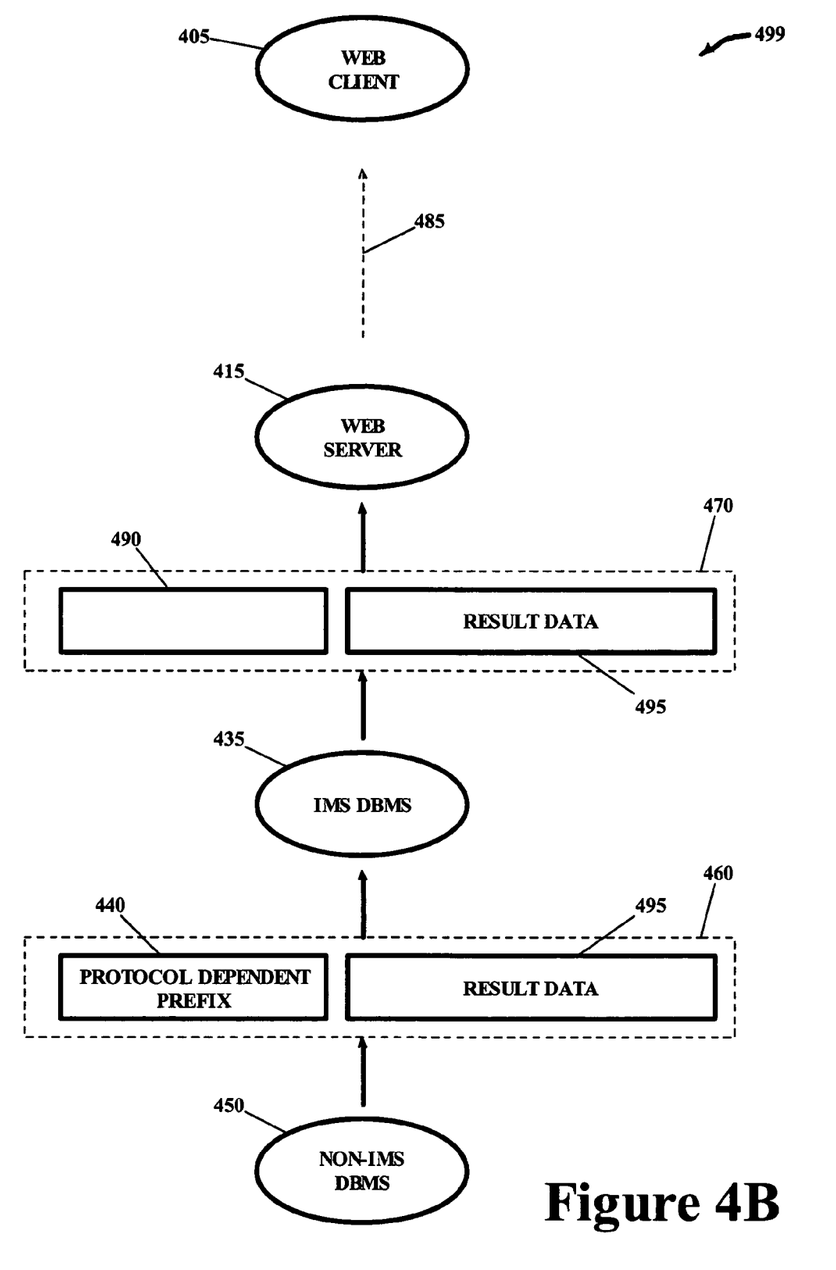

Referring now to FIG. 4B, block diagram 499 is a continuation of block diagram 400 wherein a high level flow of a result message through a prior art network comprising heterogeneous DBMS systems is shown. Non-IMS DBMS 450 generates result message 460 comprising result data 495 and protocol dependent prefix 440. Message 460 is received by IMS DBMS 435 where message 470 is generated for return to web server 415. Message 470 includes result data 495 and prefix portion 490. Prefix portion 490 is void of routing information 425, which was discarded to comply with protocol requirements for non-IMS DBMS 450, as discussed supra in conjunction with FIG. 4A. Web server 415 needs to return result data 495 to web client 405 through the network, as depicted by dashed arrow 485. However, message 470 is "orphaned" in that the routing information 425 required to locate web client 405 is missing and the ultimate destination, web client 405, cannot be determined.

The message flow depicted in FIG. 4A and FIG. 4B illustrate the "orphaned message" problem that may occur when routing messages in a prior art network comprising heterogeneous DBMS systems. This problem is addressed by the present invention, as demonstrated by the message routing depicted in FIG. 5A and FIG. 5B.

Figure 5A:
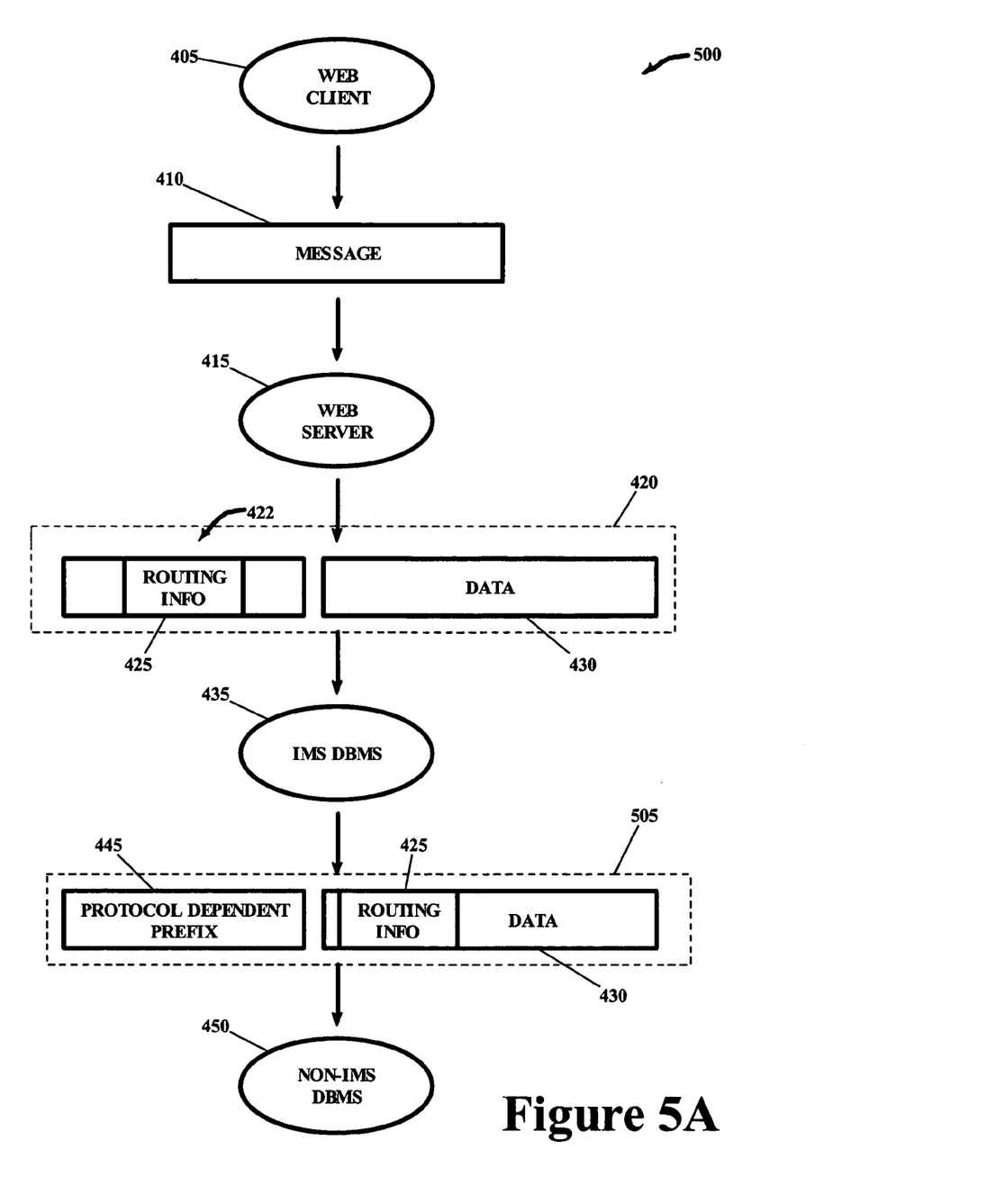
FIGS. 5A and 5B are block diagrams illustrating the flow of a network message through an exemplary computer network in accordance with the present invention.

Referring now to FIG. 5A, block diagram 500 illustrates the high level flow of a message in a heterogeneous DBMS computer network wherein the present invention has been deployed. Web client 405 generates message 410 representing a transaction to be performed by a plurality of heterogeneous DBMS systems. Message 410 is received by web server 415. Web server 415 transforms message 410 into message 420, as required to comply with message protocols for IMS DBMS 435. Message 420 comprises internet message prefix portion 422 and data portion 430. Message prefix portion 422 further comprises routing information 425 containing network address information related to web client 405.

IMS DBMS 435 receives message 420 and begins processing the transaction identified within message 420. During the course of processing, IMS DBMS 435 determines that further processing is required by non-IMS DBMS 450. Message 505 is generated by IMS DBMS 435 in accordance with the protocol requirements in effect for non-IMS DBMS 450. Message 505 comprises data portion 430, discussed supra, routing information 425 appended to data portion 430, and protocol dependent prefix portion 445. In order to comply with protocol requirements for non-IMS DBMS 450, routing information 425 is discarded from protocol 445. However, routing information 425 is not lost, as it is appended to data portion 430 prior to invoking non-IMS DBMS 450.

Non-IMS DBMS 450 receives message 505 and completes processing in accordance with the transaction information contained therein. The results from non-IMS DBMS 450 are encapsulated in a result message, as further discussed infra in conjunction with FIG. 5B.

Figure 5B:
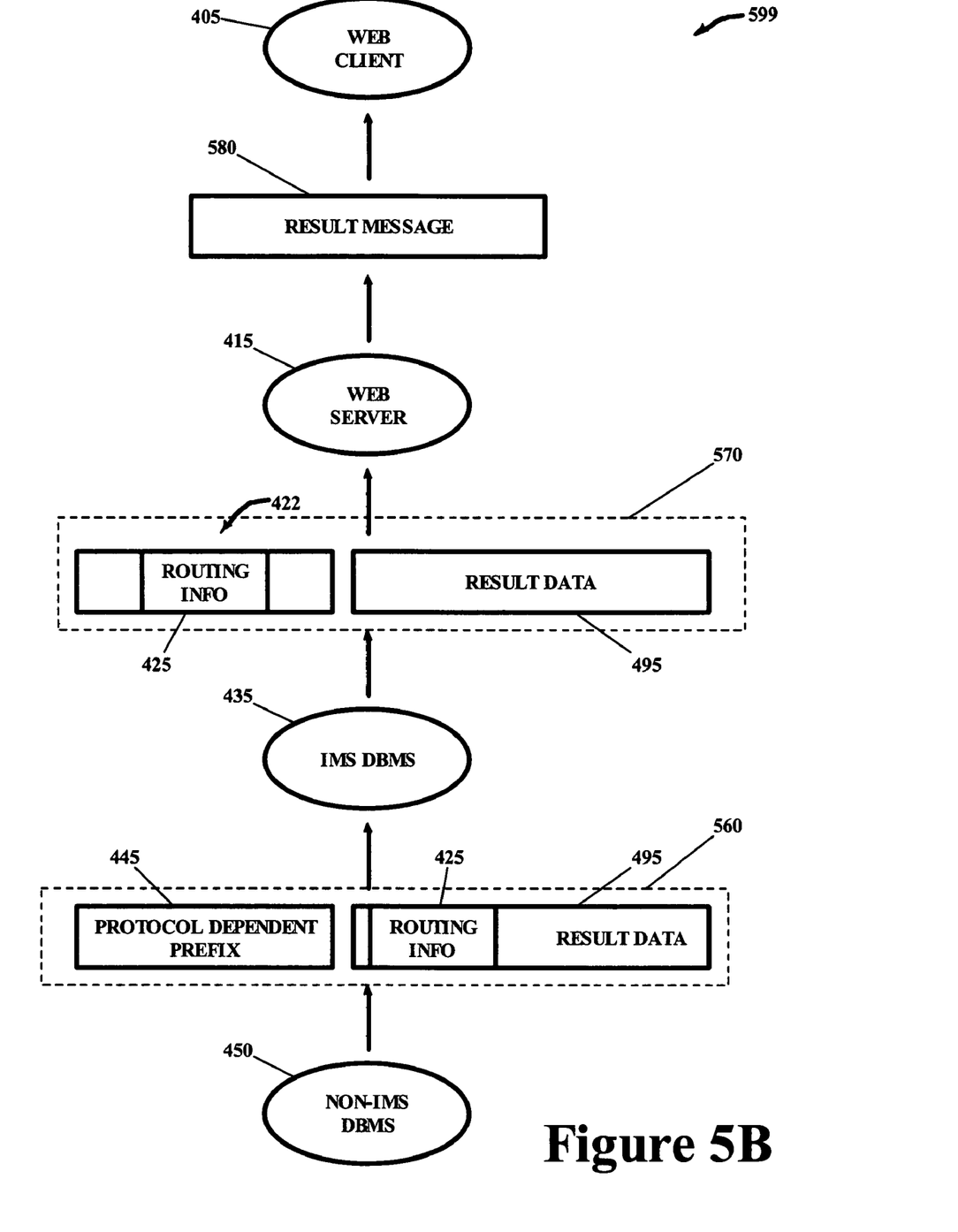

Referring now to FIG. 5B, block diagram 599 is a continuation of block diagram 500 wherein a high level flow of a result message through a computer network comprising heterogeneous DBMS systems is shown. Non-IMS DBMS 450 generates result message 560 comprising result data 495, routing information 425 appended to result data 495, and protocol dependent prefix 445. Message 560 is received by IMS DBMS 435 where message 570 is generated for return to web server 415. Message 570 includes result data 495 and prefix portion 422. Prefix portion 422 has been restored with routing information 425 by moving routing information 425 from the data portion of message 560 to prefix portion 422. Web server 415 returns result message 580 to web client 405 utilizing routing information 425, which was preserved by appending this information to the data portion of message 420 prior to invoking non-IMS DBMS 450. In this way, protocol dependent prefix 445 can conform to the requirements of the non-IMS DBMS protocol without loosing the original routing information associated with web client 405. Further teaching of the present invention includes additional detail in how message 420 is transformed to message 505, as described infra in conjunction with FIGS. 6, 7 and 8.

Figure 6:
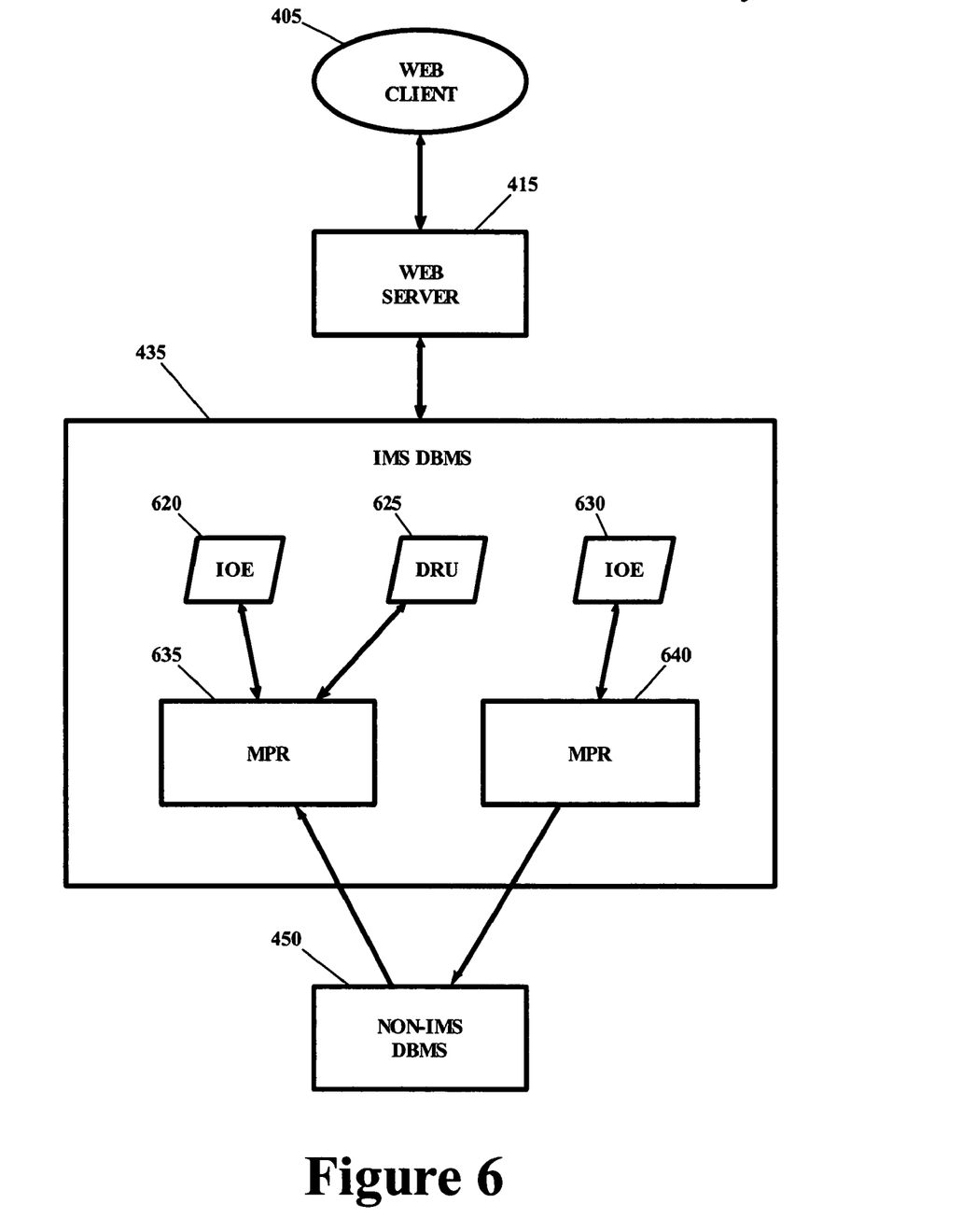
FIG. 6 is a block diagram showing the high level structure of an exemplary embodiment of the present invention.

Referring now to FIG. 6, block diagram 600 shows a structure diagram comprising IMS exits that, in one embodiment, facilitate the preservation of routing information in a computer network comprising heterogeneous DBMS systems. Web client 405 communicates with web server 415. Web server 415 communicates with IMS DBMS 435.

A transaction running in Message Processing Region (MPR) 640, responsive to a received communication from web server 415, must communicate with non-IMS DBMS 450. Prior to calling non-IMS DBMS 450 with the appropriate protocol, MPR 640 invokes IMS IOE exit 630. IMS IOE exit 630, known in the art as the IMS Input and Output Edit Exit, receives control prior to calling non-IMS DBMS 450 and performs the message transformation processing briefly mentioned supra, and discussed in greater detail in conjunction with FIGS. 7 and 8.

Non-IMS DBMS 450 returns control to IMS 435, wherein continuation of transaction processing occurs in MPR 635. MPR 635 invokes Destination Resolution (DRU) exit 625 prior to proceeding with transaction processing. IMS DRU exit 625 formats and prepares message prefix 422 for later incorporation of routing information 425 from the data portion of message 560. The web client routing information 425 is not accessible in IMS DRU exit 625; however, space for this information is reserved in message prefix 422 at this time.

When the final transaction output is ready to be sent from IMS DBMS 435, IOE exit 620 is invoked to restore client routing information 425 to the reserved space created by DRU exit 625 within message prefix 422. In addition, IOE exit 620 removes routing information 425 from the data portion of message 560. The client routing information is utilized by web server 415 to return result message 580 to web client 405.

Figure 7:
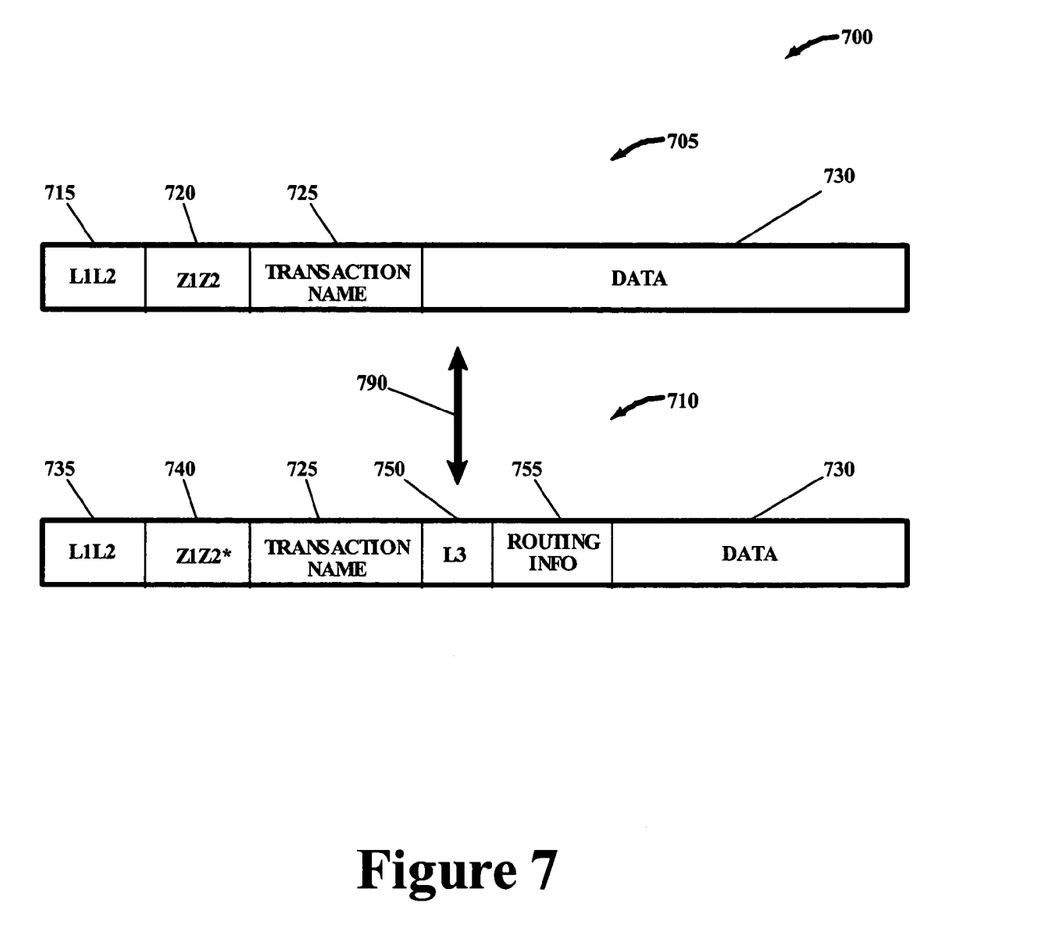
FIG. 7 shows an exemplary message transformation in accordance with the present invention.

Referring now to FIG. 7, block diagram 700 illustrates the transformation of the data portion 705 of a network message to data portion 710. Data portion 705 comprises a length field 715, a message identifier 720, a transaction name (identifying a DBMS application to receive control), and other data 730 to be passed to the DBMS application. In the prior art, two byte message identifier 720 is known as the "Z1Z2" field which represents two bytes of static predefined codes reflecting known predetermined message types.

Arrow 790 represents the transformation of data portion 705 to data portion 710 wherein all previous information contained in data portion 705 is preserved and additional routing information previously contained in the prefix portion appended to data portion 705 is integrated into data portion 710. This transformation facilitates discarding the prefix portion corresponding to data portion 705 without loss of original client routing information. Those of ordinary skill in the art recognize that the prefix portion corresponding to data portion 705 will be discarded, as a new prefix portion must be generated in order to comply with protocol requirements corresponding to the invocation of a second non-IMS DBMS system.

Data portion 710, representing the transformation of data portion 705, comprises length field 735, message type 740, transaction name 725, routing information length 750, routing information 755, and other data 730. Length field 735 is revised to reflect an expanded data portion 710, which has integrated routing information 755 and routing information length field 750. Routing information length field 750 is designated as L3 and represents the length of itself (routing information length field 750) and routing information 755.

It is significant to note that Z1Z2 of message identifier 720 is transformed and designated as Z1Z2* in message identifier 740 of data portion 710. This "*" designation is used to indicate that the message identifier Z1Z2 within the IMS DBMS is no longer a fixed predetermined set of codes, but rather reflects that the Z2 portion of the message identifier may now be dynamically extended under application control. In this way, a message that has been transformed to preserve routing information may be detected by applications crossing DBMS boundaries wherein the enhanced messages with embedded routing information within the data portion is not disruptive to the application in accessing required information from within the message.

Figure 8:
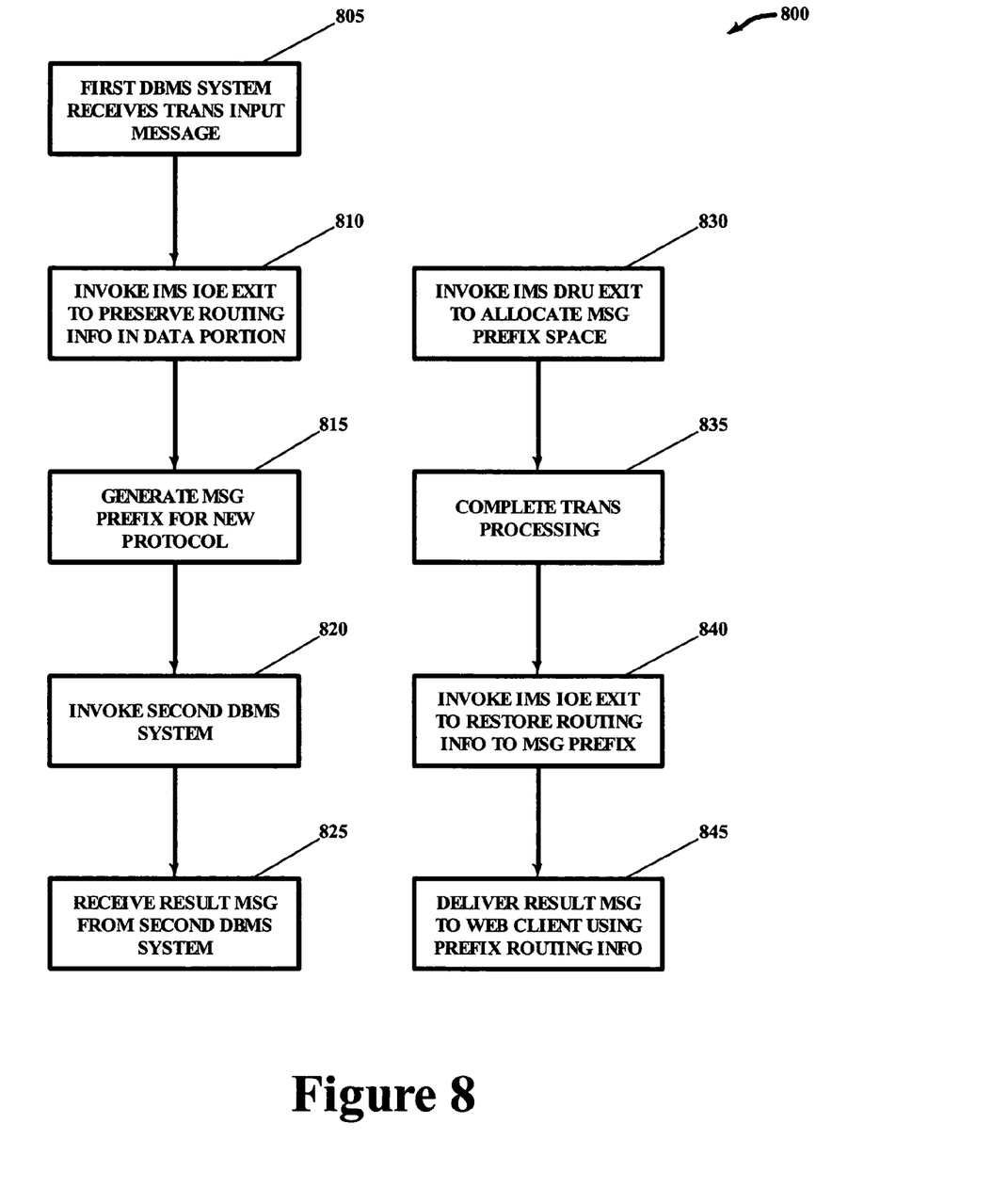
FIG. 8 is a flow diagram illustrating the logic flow for a preferred embodiment of the present invention.

Referring now to FIG. 8, flow diagram 800 illustrates a logic flow of one embodiment through a network comprising heterogeneous database management systems wherein the message transformation shown in block diagram 700 of FIG. 7 is accomplished. In step 805, an IMS DBMS system receives a transaction input message over a computer network. In step 810, the IMS DBMS invokes an IOE exit routine to preserve routing information in the data portion of the transaction message. Continuing with step 815, a new prefix portion for the transaction message is generated in accordance with the protocol requirements for a subsequent invocation of a non-IMS DBMS.

In step 820, a non-IMS DBMS system is invoked in accordance with the requirement to access non-IMS data during back-end DBMS processing. In step 825, a result message is received from the non-IMS DBMS system reflecting the results to be returned from the non-IMS DBMS system. Continuing with step 830, the IMS DBMS system invokes the IMS DRU exit routine to allocate space in the message prefix to accommodate routing information to be initialized at a later time in transaction processing.

Upon completion of step 830, the DRU exit routine returns to the IMS DBMS where, in step 835, transaction processing completes. Prior to returning to the middleware component invoking the IMS DBMS system, the IMS DBMS system, in step 840, invokes the IOE exit routine for a second time. This time, the IOE exit routine restores the routing information that was integrated into the data portion of the transaction message to the message prefix, the space for which was previously allocated in step 830, discussed supra.

In step 845, the IMS DBMS system returns control to the middleware component initiating the transaction request, whereupon the middleware component, unaware of the message transformations discussed supra, utilizes the restored routing information from the message prefix to return the transaction processing results to the web client.

Those of ordinary skill in the art will recognize that the above flow reflects processing that could be designed to operate in a variety of different ways and that the disclosed logic flow represents an implementation considered to be the best mode of operation by the inventors of the present invention. For example, the various described message transformations could be performed at different exit locations, processing could be split into a plurality of exits, or processing could be combined into a single exit. Alternatively, the above described processing could be performed without exit processing utilizing modifications to middleware components and applications programs.

Taken in combination flow diagram 800 in conjunction with supporting diagrams and detailed descriptions provide for routing messages over a computer network wherein the routing information within an internet message prefix is preserved in manner that is transparent to the selected DBMS communication protocols.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for routing messages over a computer network comprising a plurality of DBMS systems, said method comprising the steps of:
   receiving a message in a first form for communicating with a first DBMS wherein said first form comprises an internet message prefix and a data portion, and wherein said internet message prefix comprises routing information for a client;
   modifying said message into a second form wherein said routing information is integrated into said data portion of said message and wherein said second form of said message is utilized to communicate with a second DBMS;
   receiving a result message generated by said second DBMS wherein said result message comprises a result data portion and wherein said result data portion includes said routing information; and
   modifying said result message to said first form wherein said result message excludes said routing information from said result data portion and further comprises said internet message prefix, said internet message prefix comprising said routing information obtained from said result data portion, whereby said result message is routed to said client.

2. The method of claim 1 wherein said first DBMS and said second DBMS are heterogeneous.

3. The method of claim 2 wherein said first DBMS is IMS and said second DBMS is non-IMS.

4. The method of claim 1 wherein said communications to said first DBMS and said second DBMS utilize a TCP/IP protocol.

5. The method of claim 1 wherein said communications to said second DBMS utilize a SNA based protocol.

6. The method of claim 1 wherein said modifying of said message is performed by an exit routine invoked by said first DBMS.

7. The method of claim 1 wherein said modifying of said message is performed by a middleware component.

8. The method of claim 1 wherein said modifying of said result message is performed by one or more exit routines invoked by said first DBMS.

9. The method of claim 1 wherein said data portion of said second form of said message includes a Z2 indicia signifying that said data portion of said second form of said message contains said routing information.

10. A system for routing messages over a computer network comprising a plurality of DBMS systems, said system comprising:
    a computer;
    means for receiving a message in a first form for communicating with a first DBMS wherein said first form comprises an internet message prefix and a data portion, and wherein said internet message prefix comprises routing information for a client;
    means for modifying said message into a second form wherein said routing information is integrated into said data portion of said message and wherein said second form of said message is utilized to communicate with a second DBMS;
    means for receiving a result message generated by said second DBMS wherein said result message comprises a result data portion and wherein said result data portion includes said routing information; and
    means for modifying said result message to said first form wherein said result message excludes said routing information from said result data portion and further comprises said internet message prefix, said internet message prefix comprising said routing information obtained from said result data portion, whereby said result message is routed to said client.

11. The system of claim 10 wherein said first DBMS and said second DBMS are heterogeneous.

12. The system of claim 11 wherein said first DBMS is IMS and said second DBMS is non-IMS.

13. The system of claim 10 wherein said communications to said first DBMS and said second DBMS utilize a TCP/IP protocol.

14. The system of claim 10 wherein said communications to said second DBMS utilize a SNA based protocol.

15. The system of claim 10 wherein said modifying of said message is performed by an exit routine invoked by said first DBMS.

16. The system of claim 10 wherein said modifying of said message is performed by a middleware component.

17. The system of claim 10 wherein said modifying of said result message is performed by one or more exit routines invoked by said first DBMS.

18. The system of claim 10 wherein said data portion of said second form of said message includes a Z2 indicia signifying that said data portion of said second form of said message contains said routing information.

19. An article of manufacture comprising palpable physical media for use in a computer system tangibly embodying computer instructions executable by said computer system to perform process steps for routing messages over a computer network comprising a plurality of DBMS systems, said process steps comprising:
    receiving a message in a first form for communicating with a first DBMS wherein said first form comprises an internet message prefix and a data portion, and wherein said internet message prefix comprises routing information for a client;
    modifying said message into a second form wherein said routing information is integrated into said data portion of said message and wherein said second form of said message is utilized to communicate with a second DBMS;

receiving a result message generated by said second DBMS wherein said result message comprises a result data portion and wherein said result data portion includes said routing information; and modifying said result message to said first form wherein said result message excludes said routing information from said result data portion and further comprises said internet message prefix, said internet message prefix comprising said routing information obtained from said result data portion, whereby said result message is routed to said client.

20. The article of manufacture of claim 19 wherein said first DBMS and said second DBMS are heterogeneous.

21. The article of manufacture of claim 20 wherein said first DBMS is IMS and said second DBMS is non-IMS.

22. The article of manufacture method of claim 19 wherein said communications to said first DBMS and said second DBMS utilize a TCP/IP protocol.

23. The article of manufacture of claim 19 wherein said communications to said second DBMS utilize a SNA based protocol.

24. The article of manufacture of claim 19 wherein said modifying of said message is performed by an exit routine invoked by said first DBMS.

25. The article of manufacture of claim 19 wherein said modifying of said message is performed by a middleware component.

26. The article of manufacture of claim 19 wherein said modifying of said result message is performed by one or more exit routines invoked by said first DBMS.

27. The article of manufacture of claim 19 wherein said data portion of said second form of said message includes a Z2 indicia signifying that said data portion of said second form of said message contains said routing information.

* * * * *